United States Patent
De La Torre-Bueno

(10) Patent No.: US 8,179,575 B2
(45) Date of Patent: May 15, 2012

(54) CHROMATIC REGISTRATION FOR BIOLOGICAL SAMPLE IMAGING

(75) Inventor: Jose De La Torre-Bueno, Carlsbad, CA (US)

(73) Assignee: Carl Zeiss MicroImaging GmbH, Jena (DE)

( * ) Notice: Subject to any disclaimer, the term of this patent is extended or adjusted under 35 U.S.C. 154(b) by 0 days.

(21) Appl. No.: 12/581,647

(22) Filed: Oct. 19, 2009

(65) Prior Publication Data

US 2010/0097452 A1    Apr. 22, 2010

Related U.S. Application Data

(63) Continuation of application No. 11/153,257, filed on Jun. 14, 2005, now abandoned.

(51) Int. Cl.
| | | |
|---|---|---|
| H04N 1/54 | (2006.01) | |
| H04N 1/56 | (2006.01) | |
| H04N 1/58 | (2006.01) | |
| H04N 1/60 | (2006.01) | |
| G03F 3/00 | (2006.01) | |
| G03F 3/10 | (2006.01) | |
| G06K 9/46 | (2006.01) | |
| G06K 9/58 | (2006.01) | |

(52) U.S. Cl. ........ 358/518; 358/504; 358/505; 358/509; 358/510; 358/512; 358/514; 358/515; 358/520; 358/521; 358/522; 358/523; 358/525; 382/128; 382/167; 348/79; 359/16

(58) Field of Classification Search ............... 358/504, 358/505, 509, 510, 512, 514, 515, 518, 520, 358/521, 522, 523, 525; 382/167; 359/16, 502

See application file for complete search history.

(56) References Cited

U.S. PATENT DOCUMENTS

| | | | | |
|---|---|---|---|---|
| 5,088,817 A | * | 2/1992 | Igaki et al. | 356/71 |
| 5,241,372 A | * | 8/1993 | Ohba | 348/578 |
| 5,892,595 A | * | 4/1999 | Yamakawa et al. | 358/530 |
| 6,034,794 A | * | 3/2000 | Suganuma | 358/518 |
| 6,104,830 A | | 8/2000 | Schistad | |
| 6,104,839 A | | 8/2000 | Cok et al. | |
| 6,151,410 A | * | 11/2000 | Kuwata et al. | 382/167 |
| 6,208,753 B1 | * | 3/2001 | Braudaway et al. | 382/162 |
| 6,219,446 B1 | | 4/2001 | Kiriki et al. | |
| 6,424,421 B1 | * | 7/2002 | Cremer et al. | 356/620 |
| 6,504,953 B1 | | 1/2003 | Behrends | |

(Continued)

FOREIGN PATENT DOCUMENTS

WO    WO2005/036877    4/2005

(Continued)

OTHER PUBLICATIONS

U.S. Appl. No. 11/153,257, filed Jun. 14, 2005.

*Primary Examiner* — King Poon
*Assistant Examiner* — Beniyam Menberu
(74) *Attorney, Agent, or Firm* — Patterson Thuente Christensen Pedersen, P.A.

(57) ABSTRACT

Systems and techniques for chromatic distortion reduction. Relative chromatic distortion information for an imaging system may be obtained, where the relative chromatic distortion information indicates relative displacement of a first color signal and a second color signal from a reference color signal in an image. The relative chromatic distortion information may be used to modify image data.

20 Claims, 11 Drawing Sheets

U.S. PATENT DOCUMENTS

| | | |
|---|---|---|
| 6,542,187 B1 | 4/2003 | Hamilton, Jr. et al. |
| 6,587,224 B1* | 7/2003 | Nabeshima et al. ............ 358/1.9 |
| 6,611,289 B1 | 8/2003 | Yu et al. |
| 6,697,522 B1 | 2/2004 | Ishikawa |
| 6,701,007 B1 | 3/2004 | Yamaguchi |
| 6,842,290 B2* | 1/2005 | Liang et al. .................... 359/619 |
| 7,054,674 B2* | 5/2006 | Cane et al. ..................... 600/407 |
| 7,180,642 B2 | 2/2007 | Miyatake |
| 7,339,699 B1* | 3/2008 | Suzuki et al. .................. 358/1.9 |
| 7,391,926 B2* | 6/2008 | Arazaki ......................... 382/275 |
| 7,433,089 B2* | 10/2008 | Enomoto ....................... 358/474 |
| 2002/0008697 A1* | 1/2002 | Deering ........................ 345/418 |
| 2003/0002735 A1* | 1/2003 | Yamamoto et al. ........... 382/167 |
| 2003/0031375 A1* | 2/2003 | Enomoto ...................... 382/255 |
| 2004/0238731 A1* | 12/2004 | Nishiyama et al. ........... 250/234 |
| 2005/0206668 A1* | 9/2005 | Yoshida .......................... 347/12 |
| 2005/0206934 A1* | 9/2005 | Nishikawa et al. ............ 358/1.9 |
| 2005/0265588 A1* | 12/2005 | Gholap et al. ................. 382/128 |
| 2009/0189997 A1* | 7/2009 | Stec et al. .................... 348/222.1 |

FOREIGN PATENT DOCUMENTS

WO    WO 2005/036877    *    4/2005

* cited by examiner

CHROMATIC REGISTRATION FOR BIOLOGICAL SAMPLE IMAGING

RELATED APPLICATION

This application is a continuation of application Ser. No. 11/153,257 filed Jun. 14, 2005, which is hereby fully incorporated herein by reference.

FIELD OF THE INVENTION

The disclosure relates to improved chromatic registration for imaging applications, including biological sample imaging applications.

BACKGROUND OF THE INVENTION

In the field of anatomic pathology, a biological sample (such as a sample of human tissue) may be inspected and analyzed by staining the biological sample with a substance that reveals the presence of material of diagnostic interest. The sample may then be viewed using a microscope.

Some available automated imaging systems obtain images of a biological sample in a microscopic field of view. These systems capture a digital representation of the sample, in color, using a scanning instrument (such as an instrument incorporating a charge-coupled device (CCD) camera), in combination with a computer-controlled microscope.

Once an image is captured, a quantitative analysis may be performed using image-processing techniques to identify various features of pathological significance. Some imaging systems allow an operator to view and mark a region of interest on an image using computer graphics tools, and to subsequently collect and store image data.

SUMMARY OF THE INVENTION

Systems and techniques herein may provide efficient and accurate sample analysis by improving chromatic registration.

In general, in one aspect, a method comprises providing a template with a plurality of characterization features. The plurality of characterization features are positioned at a plurality of different locations on the template, and include a first characterization feature.

The method may include obtaining an image of the plurality of characterization features. The image may include a reference color component corresponding to the first characterization feature, and a second color component corresponding to the first characterization feature. In some implementations, the reference color component is a green component of the image associated with the first characterization feature, while the first and second color components are red and blue components.

The method may further comprise determining first offset information indicative of an offset between a position of the first color component and a position of the reference color component. The method may comprise determining second offset information indicative of an offset between a position of the second color component and the position of the reference color component. The method may further comprise determining offset information for each of the plurality of characterization features.

The method may further include using the determined offset information for the plurality of characterization features to determine offset information for each of a plurality of image pixels. Offset information for image pixels may be determined using interpolation of at least some of the offset information for the plurality of characterization features.

The method may further include obtaining an image of a biological sample, where the image comprises a plurality of image pixels. The method may further include modifying color component information of the image pixels using the offset information for the image pixels. The color component information may be modified by replacing the color component information for a first color component and a second color component with a corrected first color component and a corrected second color component.

In general, in another aspect, a method may include obtaining relative chromatic distortion information for an imaging system. The relative chromatic distortion information may comprise information indicative of a displacement of a position of an imaged first color with respect to an imaged reference color corresponding to a sample region of the imaging system.

The method may further comprise obtaining image data of a biological sample positioned with at least a portion in the sample region of the imaging system. The method may further comprise modifying at least some of the image data using the relative chromatic distortion information.

In general, in another aspect, a system comprises a sample positioner configured to position a sample to be imaged. The system may be configured to obtain image data of a positioned sample, where the image data comprises pixel data for a plurality of image pixels. The pixel data may include first color component pixel data, second color component pixel data, and reference color component pixel data.

The system may further comprise a data processor configured to modify first color component pixel data of a particular pixel and second color component pixel data of the particular pixel using chromatic distortion data corresponding to the particular pixel. The chromatic distortion data may be indicative of a displacement of a first color component with respect to a reference color component at a location of the particular pixel. The chromatic distortion data may further be indicative of a displacement of a second color component with respect to the reference color component at the location of the particular pixel.

In general, in another aspect, an article comprising a storage medium having stored thereon instructions that when executed by one or more machines results in obtaining relative chromatic obtaining relative chromatic distortion information for an imaging system. The relative chromatic distortion information may comprise information indicative of a displacement of a position of an imaged first color with respect to an imaged reference color corresponding to a sample region of the imaging system.

The article may further comprise instructions for obtaining image data of a biological sample positioned with at least a portion in the sample region of the imaging system, and may further comprise instructions for correcting at least some of the image data using the relative chromatic distortion information.

The details of one or more implementations are set forth in the accompanying drawings and the description below. Other features and advantages will be apparent from the description and drawings, and from the claims.

BRIEF DESCRIPTION OF THE DRAWINGS

The above and other features of the disclosure including various details of construction and combinations of parts will now be more particularly described with reference to the accompanying drawings and pointed out in the claims.

Like reference symbols in the various drawings indicate like elements.

DETAILED DESCRIPTION OF THE DRAWINGS

As noted above, a biological sample may be analyzed by staining the sample to reveal the presence of particular materials. For example, a sample may be stained with a substance that turns particular cells of interest red. The stained sample may be imaged, and the image analyzed to identify any "target" regions. Target regions are those which exhibit particular characteristics corresponding to the particular cells of interest, which may include the color (for this example, red), shape, and/or size of a region.

In an imaging system, an image of a biological sample is acquired, and then analyzed to identify any targets in the image. Target regions may subsequently be imaged at a higher magnification. Since target regions of the image are determined based on a color distribution of the image, the color distribution of the image needs to accurately correspond to the color distribution of the biological sample.

If the color distribution of the image does not accurately reflect the color distribution of the sample, the system may not perform as desired. For example, the system may fail to identify target regions in the sample (i.e., may produce false negatives), or may identify regions of the sample as targets that do not include the particular material of interest (i.e., may produce false positives). Mismatch between an actual color distribution and an imaged color distribution may be referred to as chromatic distortion.

Figure 1A:
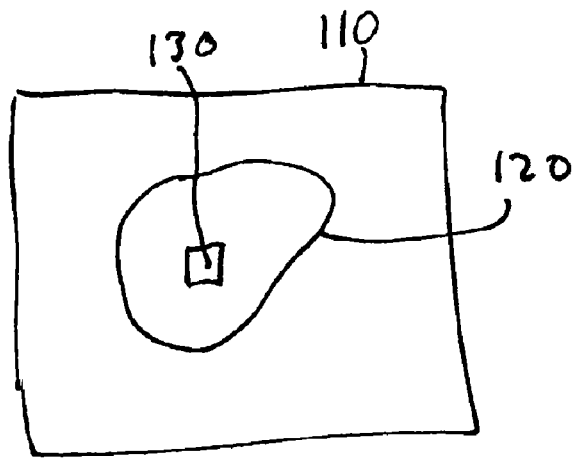
FIG. 1A illustrates a region to be imaged.
Figure 1B:
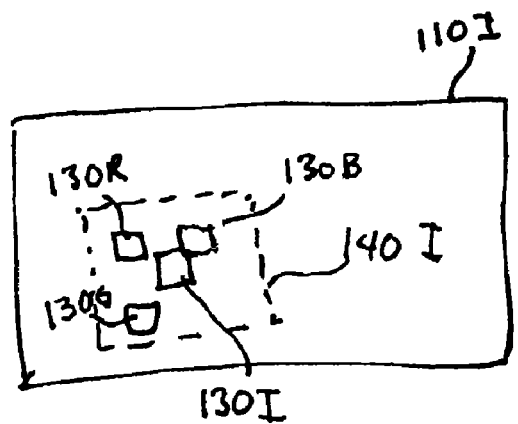
FIGS. 1B and 1C illustrate portions of images of the region shown in FIG. 1A.
Figure 1C:
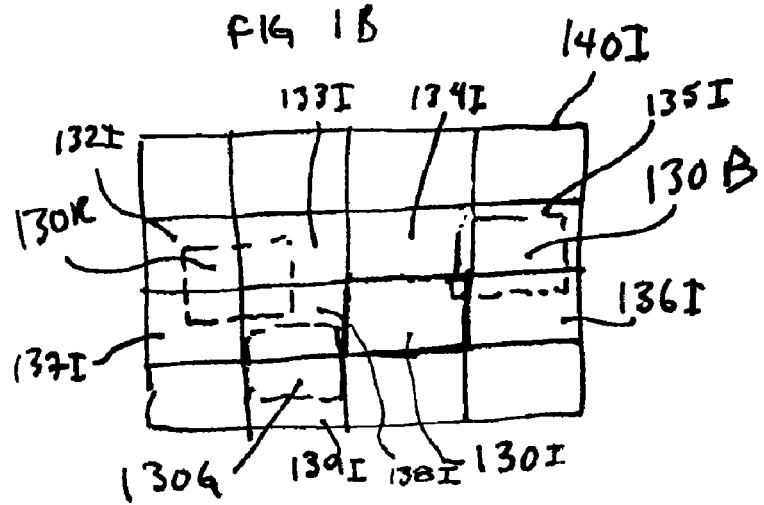

In a digital imaging system, chromatic distortion may lead to mis-registration of the blue, red, and green components in a pixilated image of a biological sample. FIGS. 1A to 1C illustrate color mis-registration due to chromatic distortion in an imaging system.

FIG. 1A includes a region 110 to be imaged, including a biological sample 120. Region 130 of sample 120 encompasses an area corresponding to a pixel in an image of region 110 (for a particular configuration of the imaging system; e.g., a particular magnification).

FIG. 1B shows an image area 110I corresponding to region 110. Pixel 130I of image area 110I corresponds to region 130 of sample 120. However, as FIG. 1B illustrates, the red component 130R, the green component 130G, and the blue component 130B of the signal corresponding to region 130 are not coincident with pixel 130I. Instead, some or all of the red, green, and blue components of the signal corresponding to region 130 of sample 120 are incident on other pixels of image area 110I. Note that the displacement shown in FIGS. 1B and 1C is exaggerated for illustrative purposes; generally, the displacement of the different components of the signal corresponding to region 130 will be less than that shown.

FIG. 1C is an expanded view of a four pixel by four pixel image sub-region 140I. As FIG. 1C illustrates, the red component 130R of the signal corresponding to region 130 is incident on pixels 132I, 133I, 137I, and 138I. Similarly, green component 130G is incident on pixels 138I and 139I, while blue component 130B is incident on pixels 134I, 135I, 130I, and 136I. Note that the pixel density in a real image is generally much greater than that shown in FIGS. 1B and 1C.

Again using the example where cells of interest are stained red, the mis-registration illustrated in FIG. 1C may result in inaccuracies. For example, if region 130 includes cells of interest, analysis of the image would attribute those red cells to regions of the sample corresponding to pixels 132I, 133I, 137I, and 138I, rather than sample region 130. The inaccuracies may require imaging at higher magnification to determine the location and nature of the red signal, which reduces the system productivity.

Figure 2:
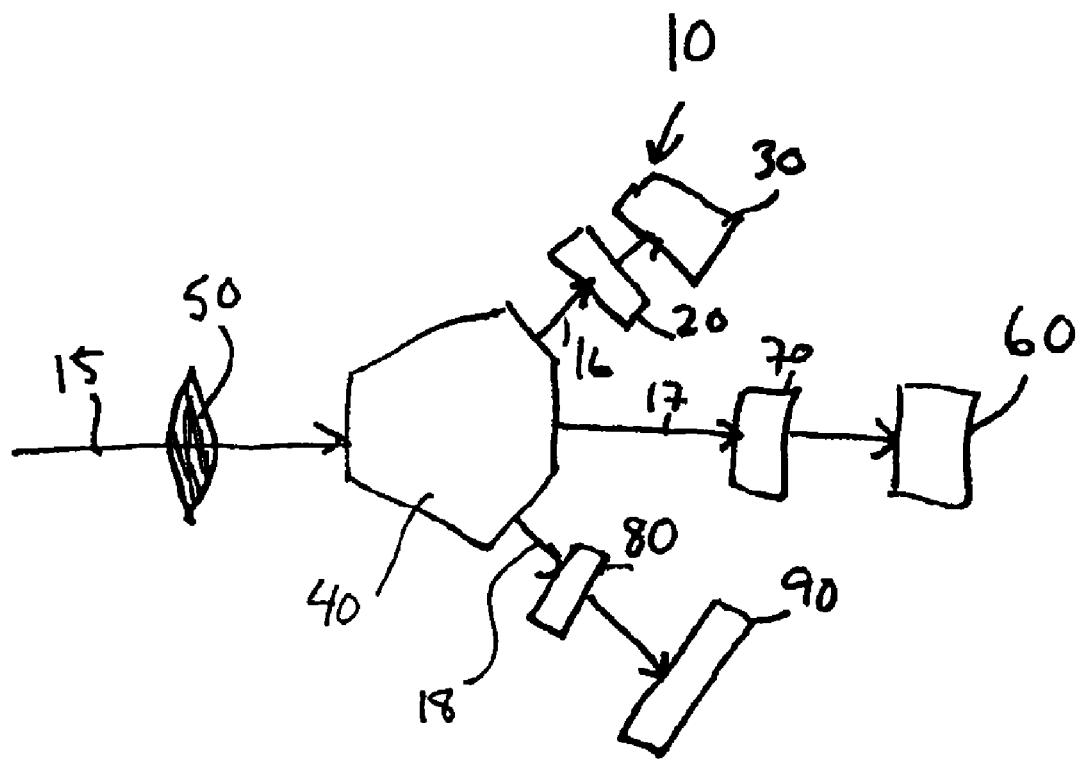
FIG. 2 shows a schematic of an imaging system that may be used to image samples.

There are a number of factors that may affect the accuracy of the color distribution of an image. These include optical, electronic, mechanical and other factors. Some of these factors will be discussed with reference to FIG. 2, which shows a schematic of a CCD camera 10 that may be used in a biological image processing system. Note that FIG. 2 is an idealized schematic of one type of image processing system that may be used; different image processing configurations may be used.

Light 15 incident on camera 10 may be focused by a lens assembly 50 including one or more lenses, and may be split by a beam splitter 40 into three components. Light 15 is light that has been, for example, reflected from a biological sample of interest. A first component 16 is incident on a blue filter 20, which transmits substantially blue light to a blue CCD 30. A second component 17 is incident on a green filter 70, which transmits substantially green light to a green CCD 60. A third component 18 is incident on a red filter 80, which transmits substantially red light to a red CCD 90. The outputs of blue CCD 30, green CCD 60, and red CCD 90 are combined to form a pixel array that is a digital image representative of the sample of interest.

One optical cause of chromatic distortion is chromatic aberration due to the different refraction indices for different light wavelengths. For example, red, green, and blue components of light 15 may be refracted differently in lens assembly 50 of FIG. 2. As a result, red, green, and blue components of light reflected from a particular spot on the sample appear to have come from different spots on the sample in the digital image.

Electronic sources of chromatic distortion include problems with time synchronicity between different color channels. Camera 10 may include a number of amplifiers and signal conditioners. The different channels are clocked, and if they are not properly synchronized, one color may be advanced over another, which generally results in a color skew and/or horizontal shift in color.

Mechanical factors may also contribute to chromatic distortion. Mechanical sources of chromatic distortion include factors such as mechanical misalignment of system components. For example, in a digital camera incorporating separate optical sensors for the red, green, and blue channels, imperfect sensor alignment may cause chromatic distortion of the image with respect to the biological sample.

Some available techniques to increase target identification accuracy include performing the analysis more slowly, and/or imaging the sample at higher magnification. For example, if the goal of a particular analysis is to identify red-tinged cells, accurate detection of two red pixels in a ten by ten pixel area may make it necessary for the system (via an operator or an algorithm) to dwell on the image area for a longer time, and/or to increase the power magnification for closer analysis. However, these techniques generally increase image acquisition and/or analysis time, which reduce productivity.

Other available techniques address particular sources of chromatic distortion. For example, improved alignment techniques may reduce mechanical contributions to chromatic distortion. Similarly, optical components such as achromatic or apochromatic doublet lenses may reduce optical chromatic distortion. However, these techniques may not be sufficient to provide desired levels of accuracy. For example, achromatic or apochromatic doublet lenses do not completely correct chromatic aberration, and their imperfections are more pronounced at higher magnifications.

Systems and techniques provided herein may allow for reduction or elimination of chromatic distortion. The effects of chromatic distortion may be reduced so that targets may be efficiently and accurately identified.

The current inventors recognized that, rather than dealing with sources of chromatic distortion individually, chromatic distortion may be reduced or eliminated by incorporating a pre-imaging process to obtain distortion characteristics of the imaging system. The distortion characteristics may subsequently be used with information obtained in an imaging process.

Figure 3:
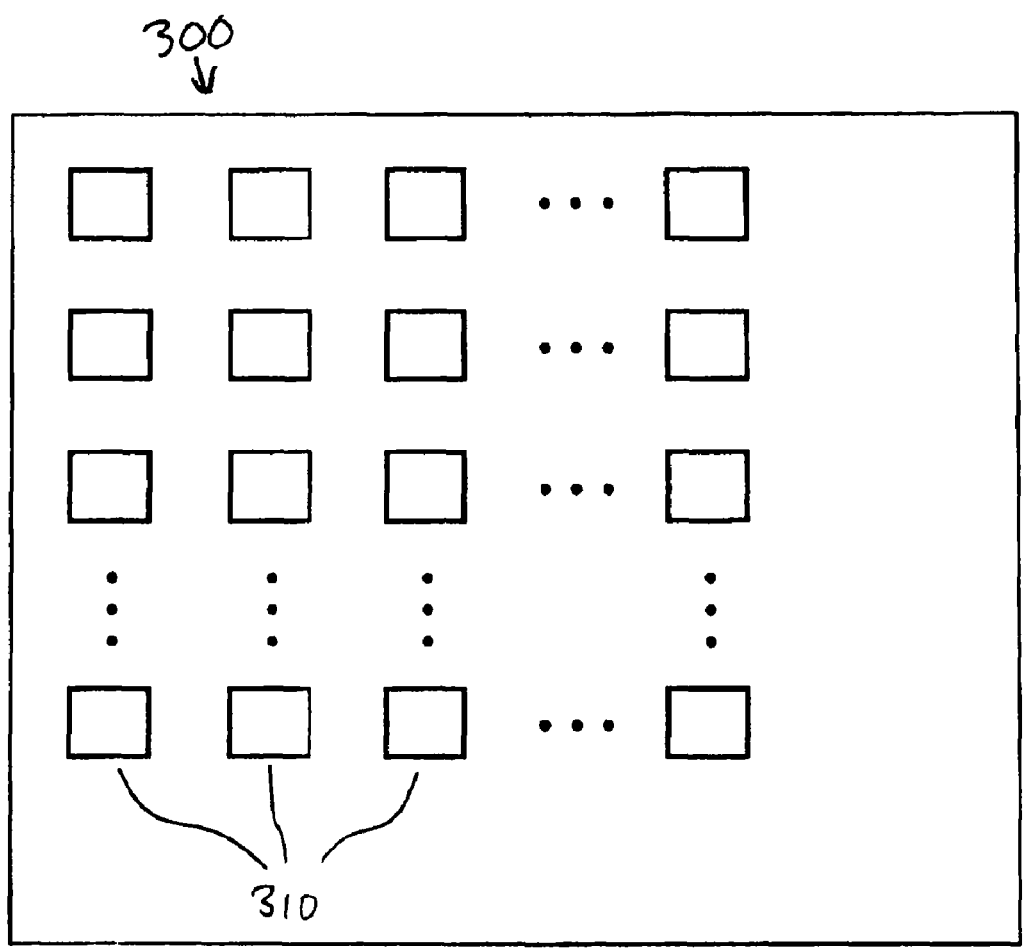
FIG. 3 illustrates a template including a plurality of characterization features, according to some implementations.

FIG. 3 shows a graphical depiction of a generally two dimensional (2D) template 300, which may be used in a pre-imaging process. Template 300 includes one or more characterization features 310 with known properties. In the example of FIG. 3, template 300 includes an array of sharp-edged figures with known shapes and sizes. Each of the geometric figures reflects (or transmits) light including red, green, and blue components. Note that the regular array of white squares shown in FIG. 3 is illustrative only. Other implementations may use different figure shapes, different spatial distributions of the figures, and the like. In some implementations, a template may be generated by depositing metal on glass to substantially block transmission of all wavelengths in the appropriate regions.

Figure 4:
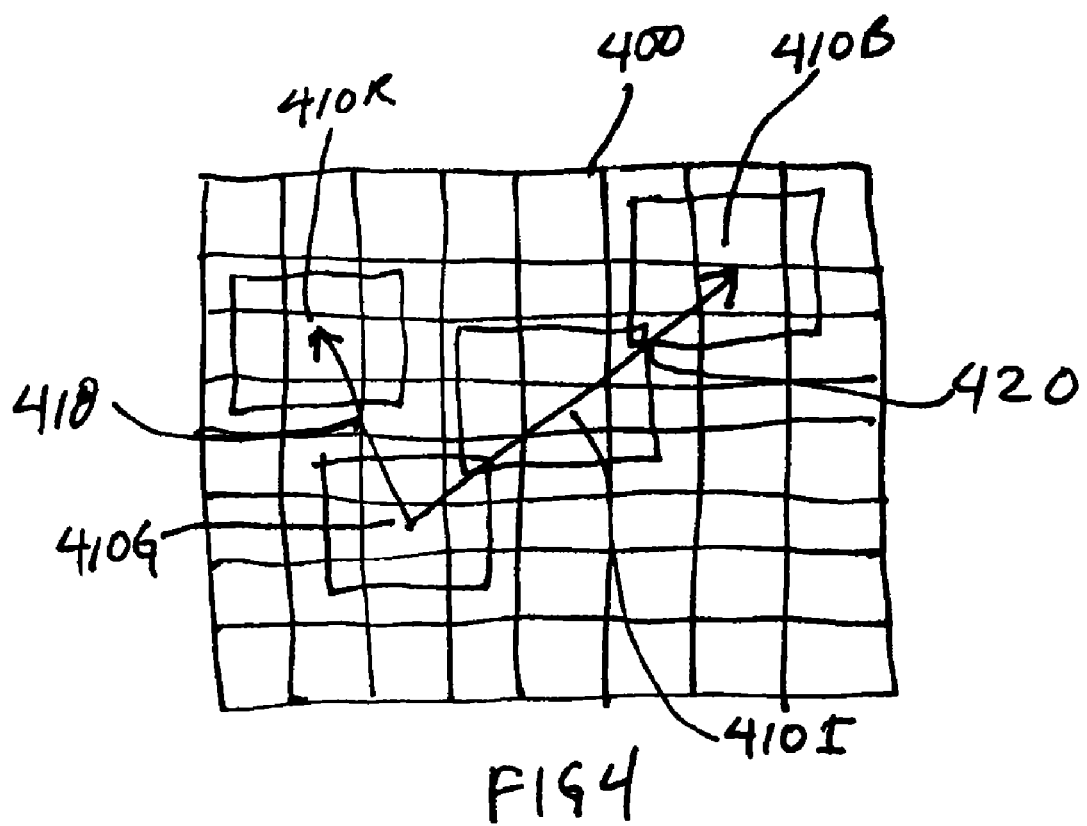
FIG. 4 illustrates an image including color components corresponding to a particular characterization feature, according to some implementations.

FIG. 4 illustrates a pre-imaging process incorporating a template such as template 300 of FIG. 3, according to some implementations. FIG. 4 shows a close up of a representation of a portion 400 of a pixel map of an image of template 300 corresponding to one of the array of figures 310. Note that although the image of figure 310 is shown on an image portion divided into 64 pixels, this is for illustration only.

In the absence of distortion, the image corresponding to FIG. 310 would be at the position designated as 410I, with the red, blue, and green signal components overlapping. However, at least one of the red, blue, and green components of the signal from FIG. 310 may be distorted due to one or more factors such as the mechanical, optical, and mechanical factors detailed above. The blue component 410B, the red component 410R, and the green component 410G are each shown displaced from position 410I, and each are shown displaced differently. Again, the displacements shown are illustrative.

The magnitude and direction of the respective displacements may depend on, for example, the focus and magnification, lens characteristics (e.g., the optics) and the electronics of the device being used. Note that although each component is shown as having the same shape and size as the ideal image, they may be different. For example, the edges may be blurred rather than sharp, they may be elongated rather than square, or may differ from the ideal image in one or more other ways.

One way to correct for the mis-registration of the red, blue, and green components of the signal is to determine offsets of each of the red, blue, and green signal components from position 410I, and then correct image data using the offsets. However, the current inventors recognized that, rather than determining offsets for all three signal components, offsets for two of the signal components with respect to the third signal component may be used to improve registration of the three components corresponding to a particular sample region. Stated differently, the image need not be corrected to correspond exactly to the ideal image in the absence of distortion. Instead, relative correction to improve the registration of the color components of the signal may be used. For example, the green component may be used as a reference, and red and blue offset vectors may be determined relative to the green component. Green may be used as the reference because the imaging system is more sensitive to green light, and the green component may provide higher resolution. In FIG. 4, red offset vector 418 and blue offset vector 420 represent the offset of red component 410R and blue component 410B from green component 410G.

In one implementation, the reference end of red offset vector 418 and blue offset vector 420 may be the centroid of green component 410G. The centroid may be determined using the intensities of the green signal in each of the nine pixels spanned (at least partially) by green component 410G. The weighted average of green color intensity across all nine pixels is the location of the centroid of green component 410G. Similarly, the other end of the red offset vector 418 may be the centroid of red component 410R, while the other end of blue offset vector 420 may be the centroid of blue component 410B.

Offset vector information may be stored in a system memory, and subsequently be used to improve the registration of an image obtained using the system. Note that FIG. 4 shows a small portion of an image of template 300. Template 300 may be imaged in its entirety, and offset vector information may be obtained for each feature 310.

Figure 5:
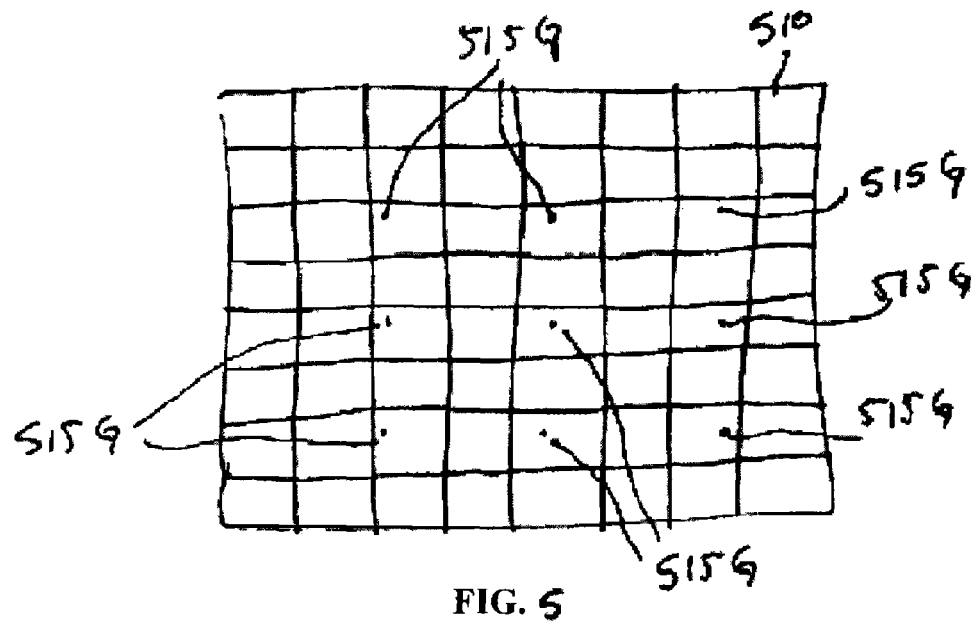
FIG. 5 illustrates locations for which distortion information has been obtained, relative to a plurality of image pixels, according to some implementations.

Once offset vector information has been obtained for the characterization features 310, it may be used to determine chromatic distortion (e.g., offset) information for each pixel in an image. FIG. 5 illustrates a simple method of interpolation. An image area 510 is an eight pixel by eight pixel representation of an image. Locations 515G each represent locations for which offset information has been obtained. Using the example discussed above, locations 515G may each be the location of the centroids of the green components of signals from each of the characterization features 310 of template 300.

Offset information for each of the sixty four pixels shown may be obtained by interpolating the offset information for the nine locations 515G. Many different interpolation methods may be used. For example, offset information for the red component may be interpolated by fitting a plane to the red offset vectors of the nearest three locations 515G to each pixel center. Commercially available algorithms may be used to determine offset information for each pixel in the image, using the measured offset information for each of the characterization features in the template. For example, commercially available software such as the Matrox Imaging Library (MIL) may be used to determine offset information for each pixel.

Offset information for each pixel may be stored and used to improve chromatic registration in a subsequently acquired image. As with the other figures herein, the number of characterization figures, their sizes and configurations, and the number of pixels in an image is exemplary only. For example, the pixel density would generally be much larger than that shown in FIG. 5.

Figure 6:
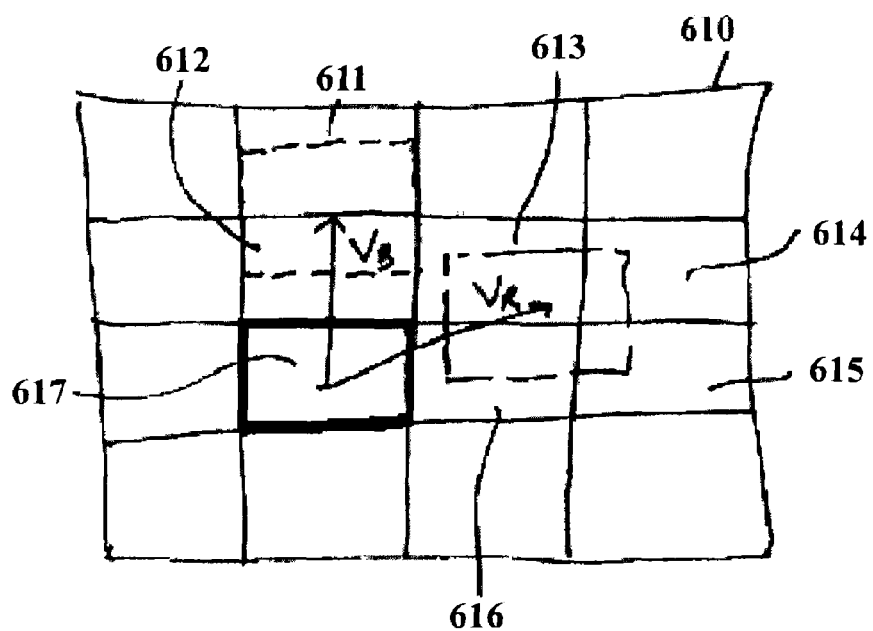
FIG. 6 illustrates relative distortion information for a pixel of a plurality of image pixels, according to some implementations.

FIG. 6 illustrates the process of improving chromatic registration in a subsequently acquired image. Image 610, shown as a four pixel by four pixel area for illustrative purposes, includes pixels 611 to 617. In order to improve the registration of pixel 617, previously acquired offset information is used. For example, a red offset vector $V_R$ (e.g., an x and a y component for $V_R$) and a blue offset vector $V_B$ (e.g., an x and a y component for $V_B$) for pixel 617 are obtained from one or more tables of offset information.

The offset vector information is used to determine a replacement value for (in this example) the red and blue signals corresponding to pixel 617. A corrected value for the red and blue components of pixel 617 is obtained by determining the value of the red and blue components whose centroid is displaced from pixel 617 by the red and blue offset vectors. The corrected value replaces the detected value.

Determining the corrected value may involve determining a contribution to the red and blue signals from more than one pixel. For example, the blue offset vector for pixel 617 corresponds to an area encompassing about half of pixel 611 and half of pixel 612. The corrected value for the blue component of pixel 617 may be half of the sum of the values for the blue component of pixels 611 and 612.

Each pixel in an image may be processed using the offset vector information as described above, and the corrected image information may be stored, displayed, and/or analyzed to determine whether the imaged sample includes one or more target regions.

In some implementations, chromatic distortion information may be determined a number of times for a particular system. For example, offset vector information may be obtained each time an imaging system is powered up, once a day, periodically, or at other time intervals. Offset vector information may be obtained as a result of some change in the imaging system; for example, upon a change of magnification.

Figure 7:
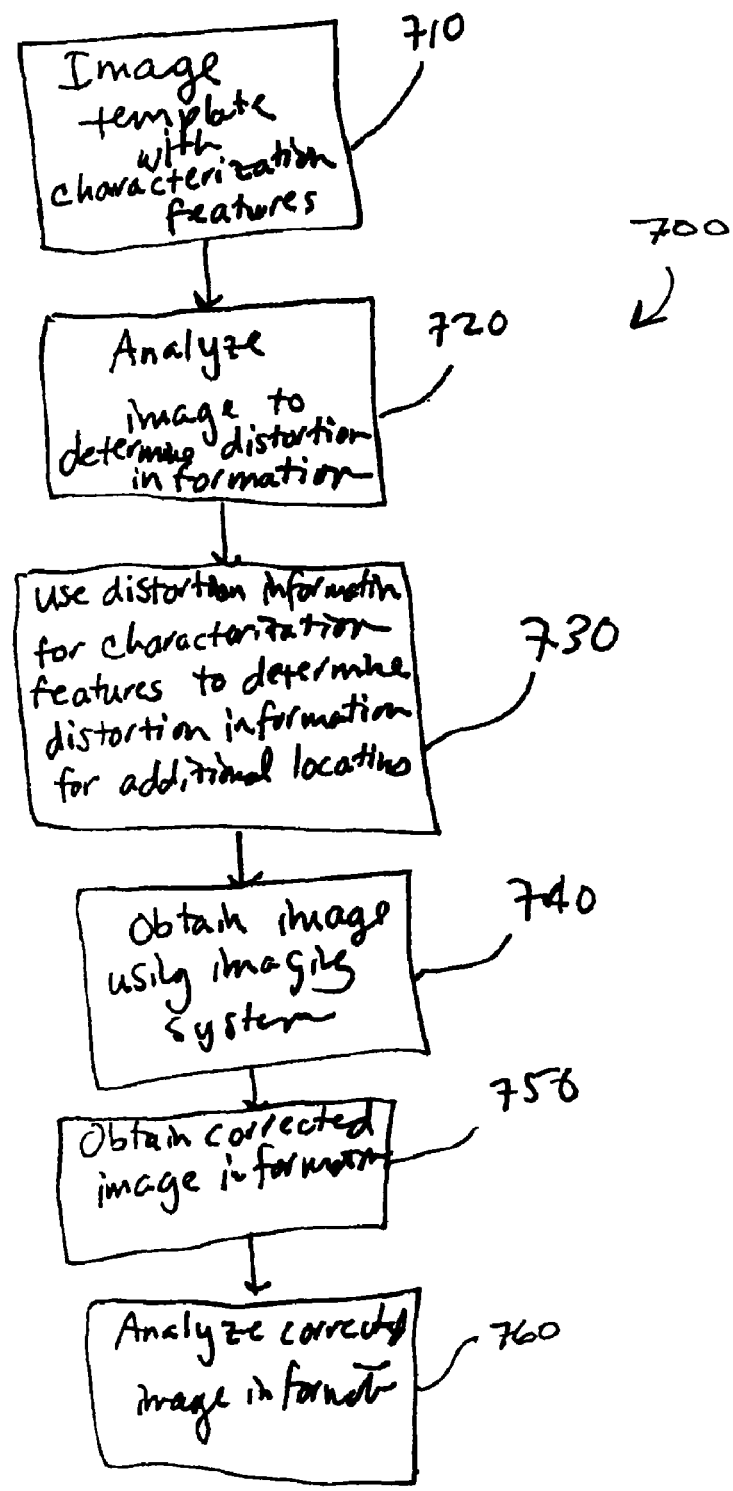
FIG. 7 illustrates method steps for reducing chromatic distortion in an image, according to some implementations.

FIG. 7 shows a process 700 that may be used to implement the systems and techniques described above. At 710, a template including a plurality of characterization features may be imaged. The number and distribution of the plurality of characterization features on the template may be chosen to obtain sufficient granularity and accuracy of chromatic distortion information. A larger number of characterization features increases the granularity of the chromatic distortion information (that is, the offset vectors are determined for more locations in an image), but may decrease the accuracy of the obtained information (since the imaged features encompass fewer pixels).

At 720, the image of the characterization features is analyzed to determine distortion information for at least some of the characterization features. For example, offset information for two colors with respect to a third color may be obtained for each characterization feature image.

At 730, the distortion information for the characterization features may be used to determine distortion information for additional locations in the image. For example, interpolation may be used to determine offset vector information for each pixel in the image. The distortion information may be stored. For example, offset vector information for a first color with respect to a reference color may be stored in a first table, and offset vector information for a second color with respect to the reference color may be stored in a second table. The offset vector information may include x- and y-component information for an offset vector. In some implementations, other types of information may be included (e.g., polar coordinates or other coordinates may be used).

At 740, an image may be obtained using the particular system. The uncorrected image information includes chromatic distortion from one or more sources, such as those described above.

At 750, the distortion information may be used to correct the obtained image information. For example, a correction algorithm may use offset vector information to replace a first color value and a second color value corresponding to a particular pixel with a corrected first color value and a corrected second color value. A third color value of the particular pixel may be assumed to be correct. The correction algorithm effectively repositions the color components corresponding to a particular region on the sample, thus minimizing or eliminating chromatic distortion. Note that the term "correction" used herein does not imply that all chromatic distortion is eliminated.

At 760, the corrected image information may then be analyzed to determine the presence of one or more target regions of the biological sample. Further imaging and/or analysis may be performed to better characterize the biological sample.

The systems and techniques described herein may be useful in a number of imaging systems and devices including digital telescopes, digital cameras, digital microscopes and the like, assuming that a reference target can be shown to the system. For example, the methods and systems of the invention can be used in conjunction with an imaging system such as automated microscope imaging system 800 of FIGS. 8A to 8E.

Figure 8A:
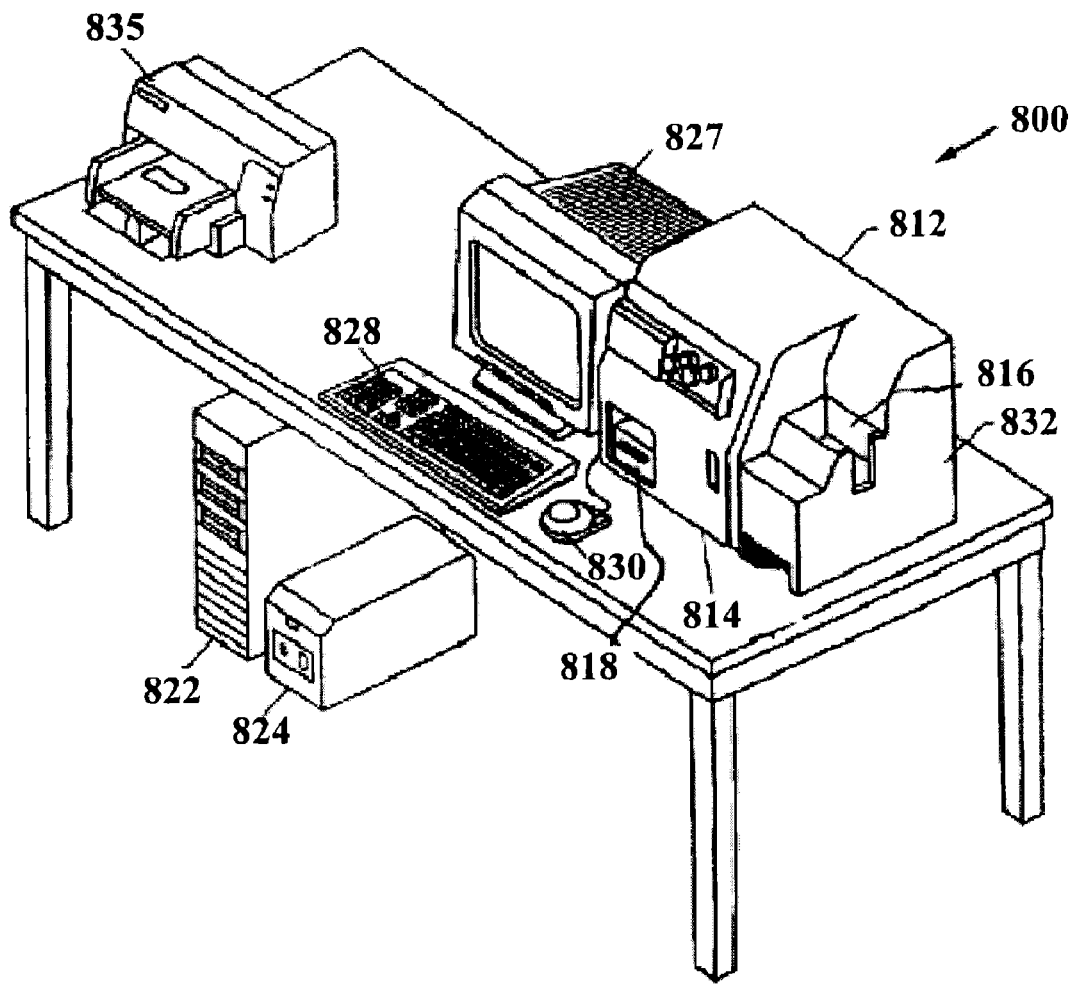
FIGS. 8A-E provide schematic representations of a system that may be used to reduce chromatic distortion, in some implementations.
Figure 8B:
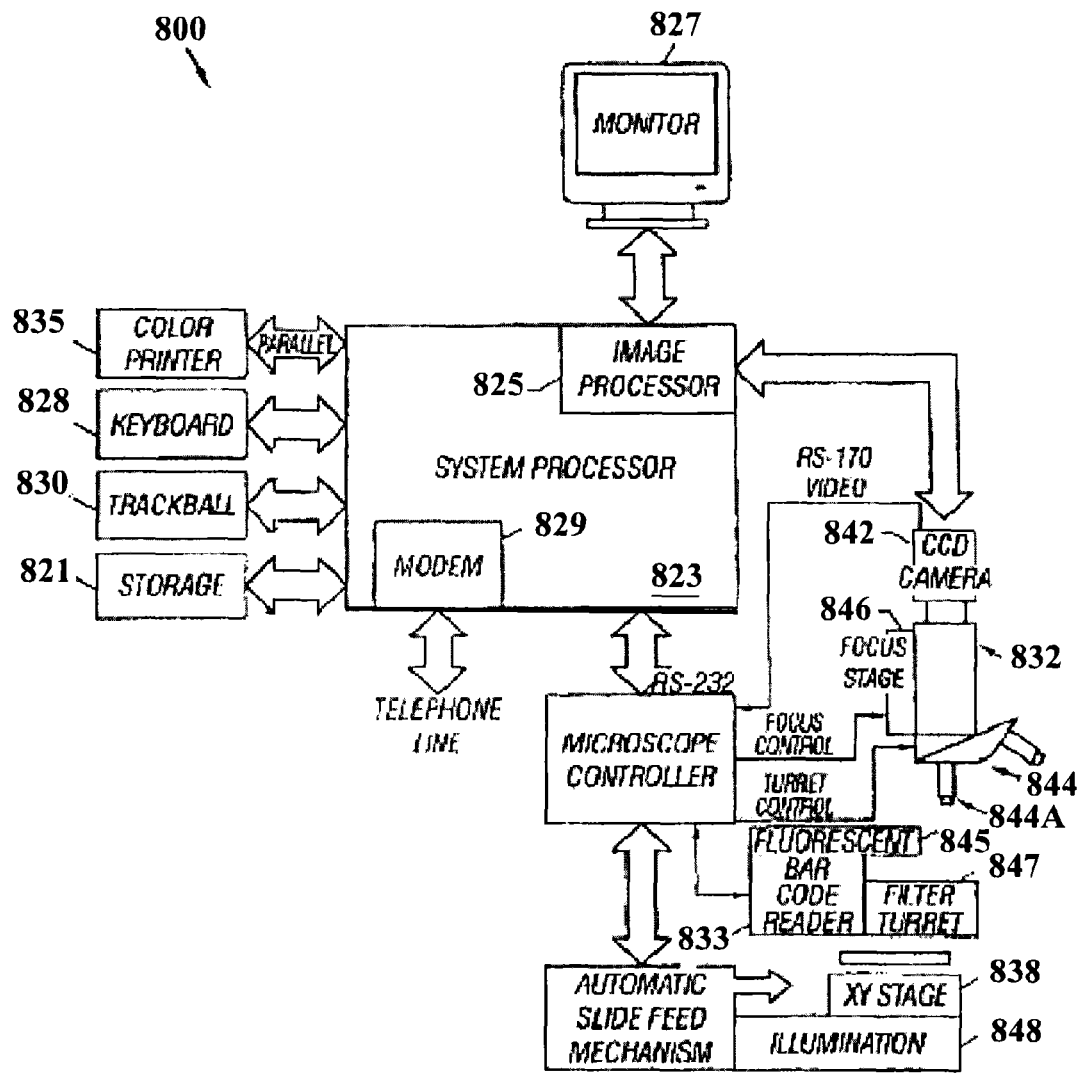
Figure 8C:
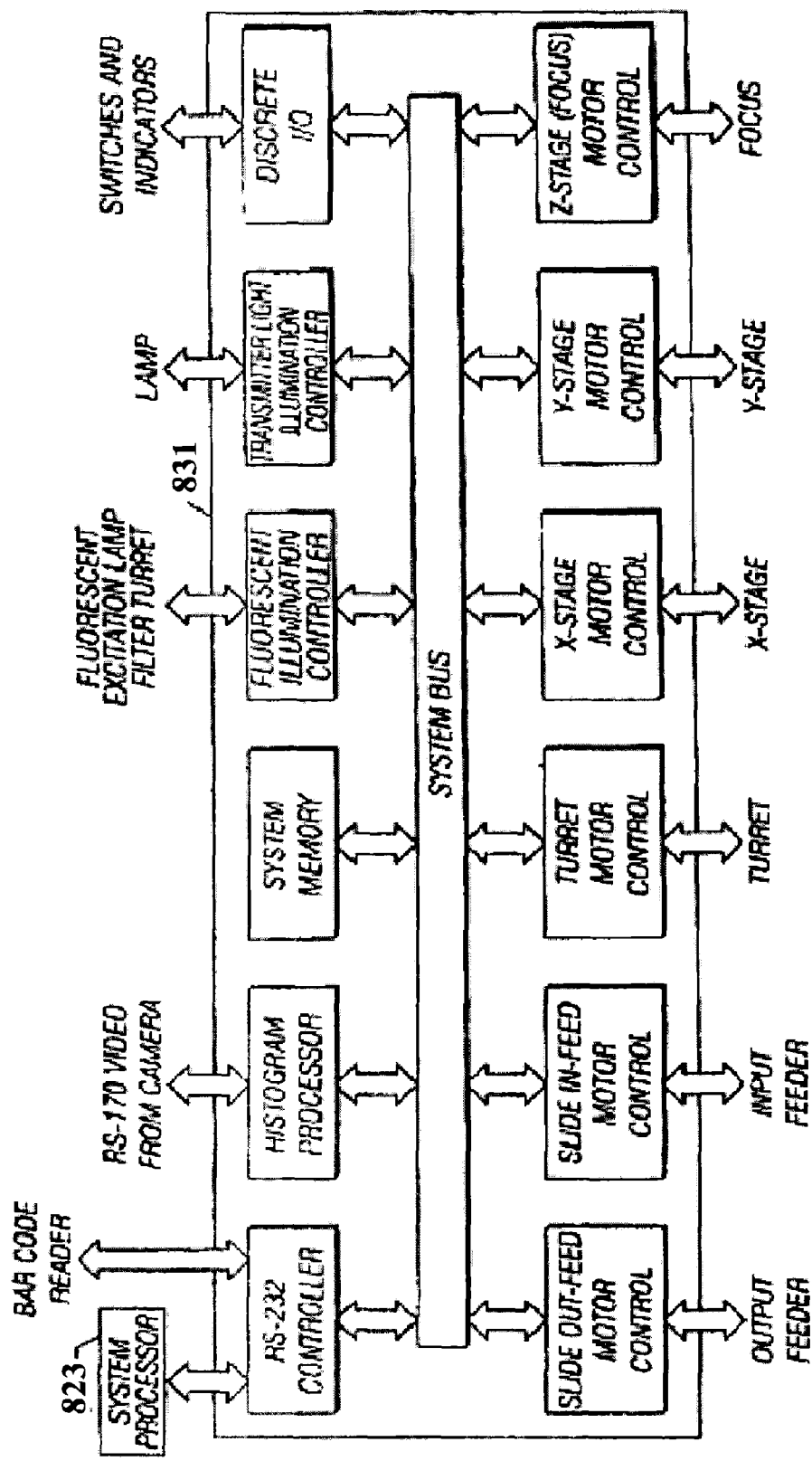
Figure 8D:
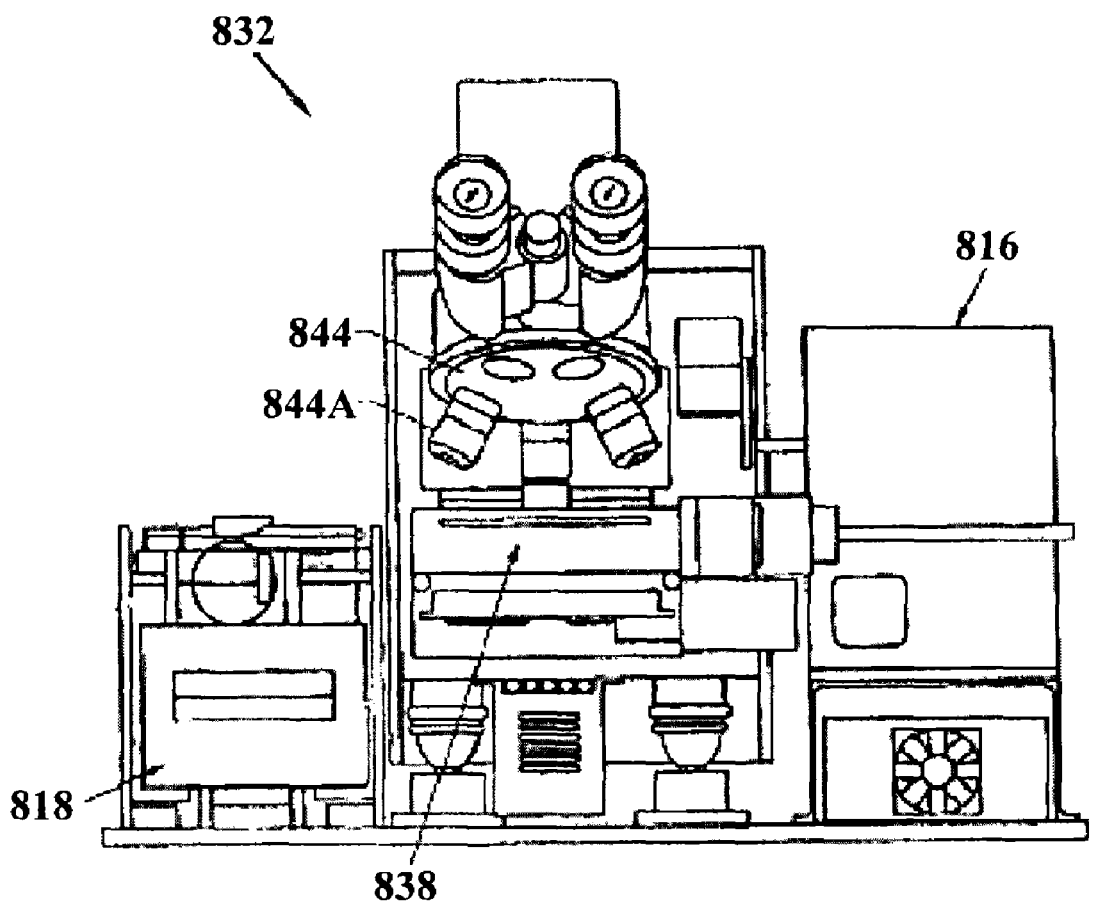
Figure 8E:
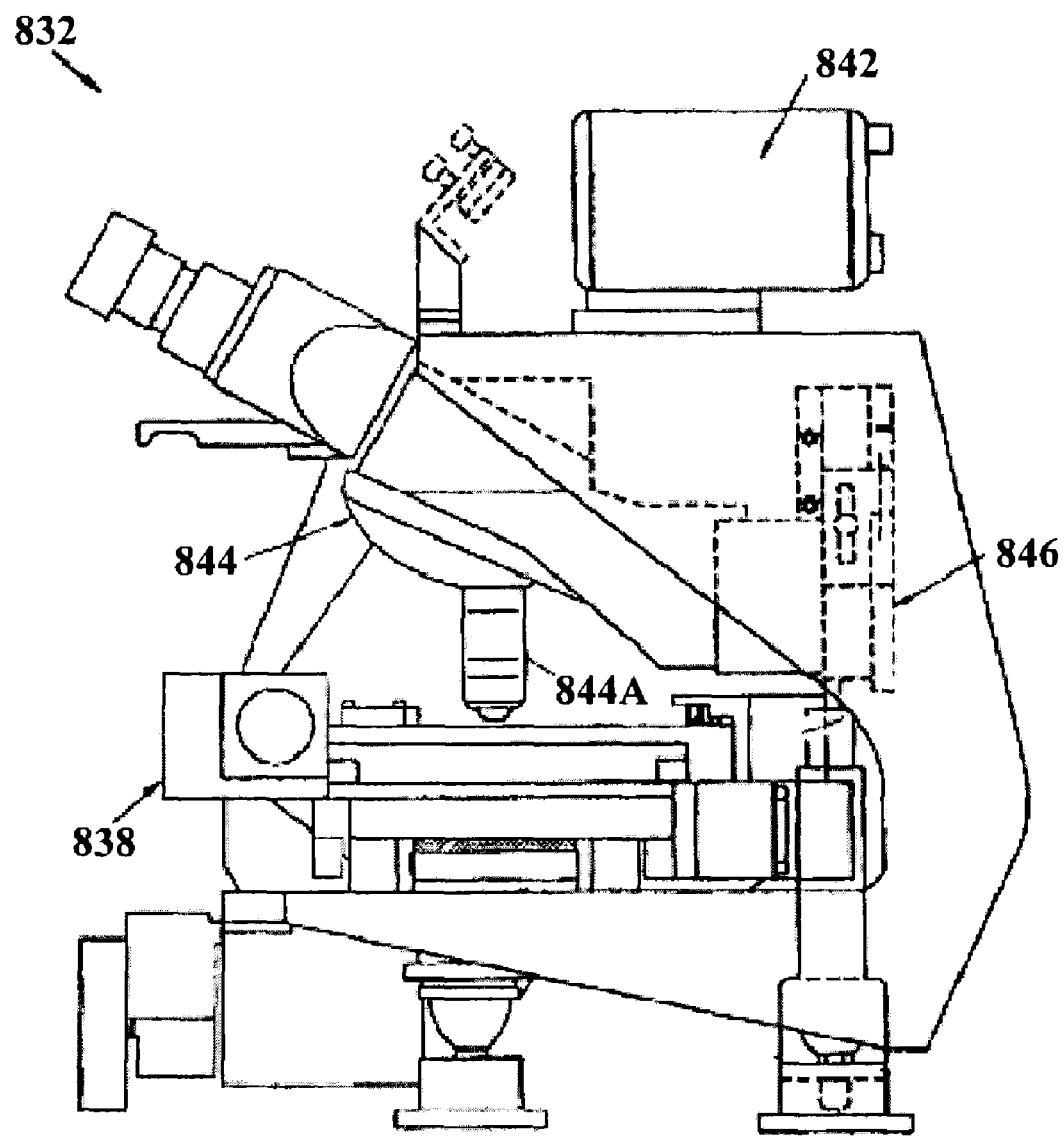

Referring now to FIGS. 8A to 8E, a machine vision apparatus for automated cell analysis of biological samples is generally indicated by reference numeral 800 as shown in perspective view in FIG. 8A and in block diagram form in FIG. 8B. The apparatus 800 comprises a microscope subsystem 832 housed in a housing 812. The housing 812 includes a slide carrier input hopper 816 and a slide carrier output hopper 818. A door 814 in the housing 812 secures the microscope subsystem from the external environment.

A computer subsystem comprises a computer 822 having at least one system processor 823, and a communications modem 829. The computer subsystem further includes a computer/image monitor 827 and other external peripherals including storage device 821, a pointing device, such as a track ball or mouse device 830, a user input device, such as a touch screen, keyboard, or voice recognition unit 828 and color printer 835. An external power supply 824 is also shown for power outage protection.

The apparatus 800 further includes an optical sensing array 842 such as, for example, a CCD camera (see, e.g., FIG. 2) for acquiring images. Microscope movements are under the control of system processor 823 through a microscope controller 831, for example, including a number of microscope-subsystem functions described further in detail. An automatic slide feed mechanism in conjunction with X-Y stage 838 provide automatic slide handling in the apparatus 800. An illuminator 848 comprising a bright field transmitted light source projects light onto a sample on the X-Y stage 838, which is subsequently imaged through the microscope subsystem 832 and acquired through optical sensing array 842 for processing by the system processor 823. A Z stage or focus stage 846 under control of the system processor 823 provides displacement of the microscope subsystem in the Z plane for focusing. The microscope subsystem 832 further includes a motorized objective turret 844 for selection of objectives.

The apparatus 800 may also include a fluorescent excitation light source 845 and may further include a plurality of fluorescent filters on a turret or wheel 847. Alternatively, a filter wheel may have an electronically tunable filter. In one aspect, fluorescent excitation light from fluorescent excitation light source 845 passes through fluorescent filter 847 and proceeds to contact a sample on the XY stage 838. Fluorescent emission light emitted from a fluorescent agent contained on a sample passes through objective 844$a$ to optical sensing array 842. The fluorescent emission light forms an image, which is digitized by an optical sensing array 842, and the digitized image is sent to an image processor 825 for subsequent processing. The image processor 825 may be a component of the system processor or a separate and distinct component of the system.

The purpose of the apparatus 800 is for the automatic scanning of prepared microscope slides for the detection of candidate objects or areas of interest such as normal and abnormal cells, e.g., tumor cells. A number of stains can be used to stain candidate objects or areas of interest and other objects (e.g., normal cells) different colors so that such cells can be distinguished from each other. The color image obtained are then processed according to the techniques described above. The corrected digital images obtained by the automated microscope system are comprised of a series of pixels arranged in a matrix, where the pixel values for two colors are corrected based on offset vector information determined with respect to a third color.

A biological sample may be prepared with one or more reagent to obtain a colored insoluble precipitate. For example, apparatus 800 may be used to detect a combination of colored precipitates as a candidate object or area of interest. A first carrier and slide may be automatically loaded onto the precision motorized X-Y stage 838. In one aspect of the disclosure, a bar code label affixed to the slide or slide carrier is read by a bar code reader 833 during this loading operation.

Each slide may then be scanned or imaged at a desired magnification, for example, 4× or 10×, to identify candidate cells or objects or areas of interest based on their color, size and shape characteristics. The term "coordinate" or "address" is used to mean a particular location on a slide or sample. The coordinate or address can be identified by any number of means including, for example, X-Y coordinates, r-θ coordinates, polar, vector or other coordinate systems.

In one aspect of the disclosure a slide is imaged or scanned under a first parameter comprising a desired magnification and using a bright field light source from illuminator 848 (see FIG. 8B) to identify a candidate cell or object or area of interest and the related coordinates.

A low magnification image of a candidate cell or object or area of interest may first be obtained. The area of interest may be subsequently imaged under different conditions; for example, at higher magnification (such as 40×), and/or under fluorescent conditions.

To reduce the number of false negatives (failure to identify candidate cells or objects or areas of interest), the system can process low magnification images by reconstructing the image from individual fields of view and then determine objects or areas of interest. In this manner, objects or areas of interest that overlap more than one objective field of view may be identified. In some aspects, a single low magnification image is acquired that is at a sufficiently low magnification that the whole (or a substantial portion thereof, e.g. 70%-99%) of the sample is imaged at one time.

The apparatus comprises a storage device 821 that can be used to store an image of a candidate cell or object or area of interest for later review by a pathologist or to store identified coordinates for later use in processing the sample or a subsample. The storage device can also be used to store color component objects identified by the methods of the invention. The storage device 821 can be a removable hard drive, DAT tape, local hard drive, optical disk, or may be an external storage system whereby the data is transmitted to a remote site for review or storage.

In some implementations, a first image of a candidate cell or object or area of interest may be obtained using a transmitted light source at either a low magnification or high magnification. Subsequently, the imaging system may return to the coordinates (or corrected coordinates) associated with each candidate cell or object or area of interest in the same sample or a related subsample to obtain a fluorescent image.

Both the fluorescent images or transmitted light (bright field) images can be stored on a storage device 821 that can be used to store an image of a candidate cell or object or area of interest for later review by a pathologist. The storage device 821 can be a removable hard drive, DAT tape, local hard drive, optical disk, or may be an external storage system whereby the data is transmitted to a remote site for review or storage. In one aspect, stored images (from both fluorescent and bright field light) can be overlapped and/or viewed in a mosaic of images for further review.

An overall detection process for a candidate cell or object or area of interest may include a combination of decisions made at more than one magnification; for example, at both a lower (e.g., 4× or 10×) and higher magnification (e.g., 40×). Decision-making at the low magnification level is broader in scope, e.g., objects that loosely fit the relevant color, size, and shape characteristics are identified at a 4× or 10× level. The decision process can be performed before or after (typically after) the systems and techniques for chromatic distortion reduction as described herein are applied.

Analysis at the 40× magnification level refines the decision-making and confirm objects as likely cells or candidate objects or areas of interest. For example, at the 40× level it is not uncommon to find that some objects that were identified at 4× or 10× are artifacts, which the analysis process will then reject. In addition, closely packed objects or areas of interest appearing at 4× or 10× may be separated at the 40× level.

In a situation where a cell straddles or overlaps adjacent image fields, image analysis of the individual adjacent image fields could result in the cell being rejected or undetected. To avoid missing such cells, the scanning operation may compensate by overlapping adjacent image fields in both the x and y directions.

Alternatively, a reconstruction method as described above may be used to reconstruct the image from multiple fields of view. The reconstructed image is then analyzed and processed to find objects or areas of interest.

An initial focusing operation is generally performed on each slide. Refocusing alleviates focus differences caused by, for example, variations of tilt of different slides in the carrier. An initial focusing operation may allow focus can be maintained automatically during scanning.

Focusing methods may vary from simple to more complex methods involving IR beam reflection and mechanical gauges. The initial focusing operation and other focusing operations to be described later may utilize a focusing method based on processing of images acquired by the system. An exemplary focusing method relies on the fact that the pixel value variance (or standard deviation) taken about the pixel value mean is maximum at best focus. A "brute-force"

method could simply step through focus, using the computer controlled Z, or focus stage, calculate the pixel variance at each step, and return to the focus position providing the maximum variance. A different exemplary focusing method includes the determination of pixel variance at a relatively coarse number of focal positions, and then the fitting a curve to the data to provide a faster means of determining optimal focus. This basic process may be applied in two steps, coarse and fine.

During a coarse focusing step, the Z stage may be stepped over a user-specified range of focus positions, with step sizes that are also user-specified. For coarse focusing, these data are generally a close fit to a Gaussian function. Therefore, this initial set of variance versus focus position data may be least-squares fit to a Gaussian function. The location of the peak of this Gaussian curve determines the initial or coarse estimate of focus position.

Following this, a second stepping operation is performed utilizing smaller steps over a smaller focus range centered on the coarse focus position. Experience indicates that data taken over this smaller range are generally best fit by a second order polynomial. Once this least squares fit is performed at the peak of the second order curve provides the fine focus position.

After determination of the best-fit focus plane, the scan area is scanned in an X raster scan over the scan area as described earlier. During scanning, the X stage is positioned to the starting point of the scan area, the focus (Z) stage is positioned to the best fit focus plane, an image is acquired and processed as described herein, and this process is repeated for all points over the scan area. In this way, focus may be maintained automatically without the need for time-consuming refocusing at points during scanning.

In some implementations, prior to confirmation of candidate cells or objects or areas of interest at a 40× or 60× level, a refocusing operation may be performed. Refocusing may be beneficial, since the use of higher magnification may require more precise focus than the best-fit plane provides.

This process is similar to the fine focus method described earlier. This is accomplished by stepping through a range of focus positions with the Z stage, calculating the image variance at each position, fitting a second order polynomial to these data, and calculating the peak of this curve to yield an estimate of the best focus position. This final focusing step differs from previous ones in that the focus range and focus step sizes are generally smaller, since this magnification may require focus settings to within 0.5 micron or better.

It should be noted that for some combinations of cell staining characteristics, improved focus can be obtained by numerically selecting the focus position that provides the largest variance, as opposed to selecting the peak of the polynomial. In such cases, the polynomial may be used to provide an estimate of best focus, and a final step selects the actual Z position giving highest pixel variance. It should also be noted that if the parameters indicate that the focus position is inadequate, the system may be configured to automatically revert to a coarse focusing process as described above. This allows variations in specimen thickness to be accommodated in a relatively expeditious manner.

The methods of the disclosure may be combined with additional imaging algorithms and processes to identify objects or areas of interest in a sample. Such imaging process may be performed prior to, concurrently with, or after the exemplary systems and techniques shown in the figures and described above.

Additional imaging processes may include color space conversion, low pass filtering, background suppression, artifact suppression, morphological processing, and blob analysis. The system may optionally be configured to perform any or all of these processes, and may be configured to determine whether to perform particular processes more than once (e.g., several times in a row).

For example, in the case of a sample comprising multiple markers stained with different agents, a vector of the average of red, green, and blue values may be made for each control slide stained with a single agent. A sample stained with multiple agents may then be measured, and the pixel value calculated. Each pixel channel obtained from the experimental sample is generally proportional to the amount of the corresponding stain in an area of interest. A conversion factor determined from the controls may then be used to directly and independently determine the amount of the multiple stains present in each pixel value (see, e.g., co-owned U.S. application Ser. No. 10/822,561, incorporated herein by reference).

In general, a candidate object of interest, such as a tumor cell, is detected based on a combination of characteristics, including size, shape, and color. In one aspect, a step in the detection of the candidate object of interest or area of interest is a measurement of a particular color in an image of the sample based, in part, upon the systems and techniques described herein.

Additional, exemplary methods include a process whereby a signal representative of a pixel color value is converted to a plurality of signals, each signal representative of a component color value including a hue (H) value, a saturation (S) value, and an intensity (I) value (which may be referred to as defining an HSI color space).

In such an implementation, an associated range of values for each component color value may be set. The range of values associated with the hue value comprises a range of values between a high hue value and a low hue value, the range of values associated with the saturation value comprises a range of values above a low saturation value, and the range of values associated with the intensity value comprises a range of values between a high intensity value and a low intensity value.

The ranges together define a non-rectangular subvolume in HSI color space. A determination may be made whether each of the component values falls within the associated range of values. A signal indicating whether the pixel color value falls within the color range may be output, in response to each of the component values falling within the associated range of values.

An implementation including such a process can be executed on a system including a converter to convert a signal representative of a pixel color value to a plurality of signals representative of component color values including a hue value, a saturation value, and an intensity value.

The apparatus may include a hue comparator determines if the hue value falls within a first range of values. The apparatus may further include a saturation comparator to determine if the saturation value falls within a second range of values, as well as an intensity comparator to determine if the intensity value falls within a third range of values. In addition, a color identifier connected to each of the hue comparator, the saturation comparator, and the intensity comparator, may be adapted to output a signal representative of a selected color range in response to the hue value falling within the first range of values, the saturation value falling within the second range of values, and the intensity value falling within the third range of values.

As used herein, a biological sample and/or subsample includes a biological material obtained from or derived from a living (or previously living) organism. Typically a biological sample will comprise proteins, polynucleotides, organic material, cells, tissue, and any combination of the foregoing. Such samples include, but are not limited to, hair, skin, tissue, cultured cells, cultured cell media, and biological fluids.

A tissue is a mass of connected cells and/or extracellular matrix material (e.g., CNS tissue, neural tissue, eye tissue, placental tissue, mammary gland tissue, gastrointestinal tissue, musculoskeletal tissue, genitourinary tissue, and the like) derived from, for example, a human or other mammal and includes the connecting material and the liquid material in association with the cells and/or tissues.

A biological fluid is a liquid material derived from, for example, a human or other mammal. Such biological fluids include, but are not limited to, blood, plasma, serum, serum derivatives, bile, phlegm, saliva, sweat, amniotic fluid, mammary fluid, and cerebrospinal fluid (CSF), such as lumbar or ventricular CSF. A sample also may be media containing cells or biological material.

The various techniques, methods, and aspects of the disclosure described herein can be implemented in part or in whole using computer-based systems and methods. Additionally, computer-based systems and methods can be used to augment or enhance the functionality described above, increase the speed at which the functions can be performed, and provide additional features and aspects as a part of, or in addition to, those of the disclosure described elsewhere in this document. Various computer-based systems, methods and implementations in accordance with the above-described technology are presented below.

A processor-based system for carrying out a method of the disclosure can include a main memory, typically random access memory (RAM), and can also include a secondary memory. The secondary memory can include, for example, a hard disk drive and/or a removable storage drive, representing a floppy disk drive, a magnetic tape drive, an optical disk drive, and the like. The removable storage drive reads from and/or writes to a removable storage medium. Removable storage medium refers to a floppy disk, magnetic tape, optical disk, and the like, which is read by, and written to by, a removable storage drive. As will be appreciated, the removable storage medium can comprise computer software and/or data.

In alternative embodiments, the secondary memory may include other similar means for allowing computer programs or other instructions to be loaded into a computer system. Such means can include, for example, a removable storage unit and an interface. Examples of such can include a program cartridge and cartridge interface (such as the found in video game devices), a movable memory chip (such as an EPROM or PROM) and associated socket, and other removable storage units and interfaces, which allow software and data to be transferred from the removable storage unit to the computer system.

The computer system can also include a communications interface. Communications interfaces allow software and data to be transferred between a computer system and external devices. Examples of communications interfaces can include a modem, a network interface (such as, for example, an Ethernet card), a communications port, a PCMCIA slot and card, and the like. Software and data transferred via a communications interface are in the form of signals, which can be electronic, electromagnetic, optical or other signals capable of being received by a communications interface. These signals are provided to communications interface via a channel capable of carrying signals and can be implemented using a wireless medium, wire or cable, fiber optics or other communications medium. Some examples of a channel can include a phone line, a cellular phone link, an RF link, a network interface, and other communications channels.

A computer program medium and computer usable medium are used to refer generally to media such as a removable storage device, a disk capable of installation in a disk drive, and signals on a channel. These computer program products are means for providing software or program instructions to a computer system.

Computer programs (sometimes referred to as computer control logic) are stored in main memory and/or secondary memory. Computer programs can also be received via a communications interface. Such computer programs, when executed, enable the computer system to perform the features of the disclosure as discussed herein. In particular, the computer programs, when executed, enable the processor to perform the features of the disclosure. Accordingly, such computer programs represent controllers of the computer system.

In an embodiment where the elements are implemented using software, the software may be stored in, or transmitted via, a computer program product and loaded into a computer system using a removable storage drive, hard drive or communications interface. The control logic (software), when executed by the processor, causes the processor to perform the functions of the disclosure as described herein.

In another embodiment, the elements are implemented primarily in hardware using, for example, hardware components such as PALs, application specific integrated circuits (ASICs) or other hardware components. Implementation of a hardware state machine so as to perform the functions described herein will be apparent to person skilled in the relevant art(s). In yet another embodiment, elements are implanted using a combination of both hardware and software.

In another embodiment, the computer-based methods can be accessed or implemented over the World Wide Web by providing access via a Web Page to the methods of the disclosure. Accordingly, the Web Page is identified by a Universal Resource Locator (URL). The URL denotes both the server machine and the particular file or page on that machine. In this embodiment, it is envisioned that a consumer or client computer system interacts with a browser to select a particular URL, which in turn causes the browser to send a request for that URL or page to the server identified in the URL. Typically the server responds to the request by retrieving the requested page and transmitting the data for that page back to the requesting client computer system (the client/server interaction is typically performed in accordance with the hypertext transport protocol ("HTTP")). The selected page is then displayed to the user on the client's display screen. The client may then cause the server containing a computer program of the disclosure to launch an application to, for example, perform an analysis according to the disclosure.

Although only a few embodiments have been disclosed in detail above, other modifications are possible, and this disclosure is intended to cover all such modifications, and most particularly, any modification which might be predictable to a person having ordinary skill in the art. For example, although implementations are discussed in which offset vector information is obtained for first and second colors with respect to a third (reference) color, the form of the offset vector information may be different than that described herein. Additionally, different methods may be used to determine distortion information for the image pixels (e.g., different interpolation methods and the like).

Also, only those claims which use the words "means for" are intended to be interpreted under 35 USC 112, sixth paragraph. Moreover, no limitations from the specification are intended to be read into any claims, unless those limitations are expressly included in the claims.

It will be understood that the particular implementations discussed and illustrated herein are exemplary and not limiting. The principles and features of this disclosure may be employed in varied and numerous embodiments without departing from the scope of the disclosure. Accordingly, other embodiments are within the scope of the following claims.

The invention claimed is:

1. A computer implemented method for determining chromatic distortion information, the method comprising:
   providing a template including a plurality of characterization features at a plurality of different locations on the template thereby forming an array of discrete geometric figures, the plurality of characterization features including a first characterization feature;
   obtaining an image of the plurality of characterization features using an imaging system including a microscope and an optical sensing array, wherein the image includes a reference color component corresponding to the first characterization feature, a first color component corresponding to the first characterization feature, and a second color component corresponding to the first characterization feature;
   determining first offset information indicative of a two-dimensional offset between a position of the first color component and a position of the reference color component; and
   determining second offset information indicative of a two-dimensional offset between a position of the second color component and the position of the reference color component, and wherein a number of characterization features forming the array is chosen to obtain a sufficient granularity and an accuracy of chromatic distortion information, and wherein the number of characterization features is directly proportional to the granularity, and inversely proportional to the accuracy of the chromatic distortion information.

2. The method of claim 1, further comprising:
   for each of the plurality of characterization features:
   determining first offset information indicative of a two-dimensional offset between a position of an associated first color component of the characterization feature and a position of an associated reference color component of the characterization feature; and
   determining second offset information indicative of a two-dimensional offset between a position of an associated second color component of the characterization feature and a position of an associated reference color component of the characterization feature.

3. The method of claim 2, further comprising:
   determining first offset information corresponding to a first image pixel using the first offset information associated with one or more of the plurality of characterization features.

4. The method of claim 2, further comprising:
   determining second offset information corresponding to a first image pixel using the second offset information associated with one or more of the plurality of characterization features.

5. The method of claim 2, further comprising:
   determining first and second offset information corresponding to a plurality of image pixels, wherein determining first and second offset information corresponding to each of the plurality of image pixels comprises using first and second offset information associated with one or more of the plurality of characterization features.

6. The method of claim 5, further comprising:
   obtaining an image of a biological sample using the imaging system, the image of the biological sample comprising a plurality of image pixels, each of the plurality of image pixels including reference color component information, first color component information, and second color component information; and
   for a first pixel of the plurality of image pixels, modifying the first color component information using first offset information corresponding to the first pixel.

7. The method of claim 6, wherein modifying the first color component information using first offset information corresponding to the first pixel comprises:
   determining corrected first color component information using the first offset information; and
   replacing the first color component information with the corrected color component information.

8. The method of claim 1, wherein the position of the first color component corresponding to the first characterization feature is a centroid of the first color component.

9. The method of claim 8, further comprising determining the centroid of the first color component.

10. A computer implemented method for chromatic registration of biological sample imaging, the method comprising:
    obtaining relative chromatic distortion information for an imaging system, the relative chromatic distortion information comprising information indicative of a two-dimensional displacement of a position of an imaged first color with respect to an imaged reference color corresponding to a sample region of the imaging system, wherein obtaining relative chromatic distortion information includes providing a template including a plurality of characterization features at a plurality of different locations on the template thereby forming an array of discrete geometric figures, the plurality of characterization features including a first characterization feature;
    obtaining an image of the plurality of characterization features using the imaging system, the imaging system including a microscope and an optical sensing array, wherein the image includes a reference color component corresponding to the first characterization feature, and a first color component corresponding to the first characterization feature; and
    determining first offset information indicative of an offset between a position of the first color component and a position of the reference color component;
    wherein a number of characterization features forming the array is chosen to obtain a granularity and an accuracy of chromatic distortion information, and wherein the number of characterization features is directly proportional to the granularity, and inversely proportional to the accuracy of the chromatic distortion information;
    obtaining image data of a biological sample positioned with at least a portion in the sample region of the imaging system; and
    modifying at least some of the image data using the relative chromatic distortion information.

11. The method of claim 10, wherein the relative chromatic distortion information further comprises information indicative of a two-dimensional displacement of a position of an imaged second color with respect to an imaged reference color corresponding to the sample region of the imaging system.

12. The method of claim 10, wherein the image data comprises image data for a plurality of image pixels, and wherein obtaining relative chromatic distortion information for an imaging system comprises obtaining relative chromatic distortion information for each of the plurality of image pixels.

13. The method of claim 12, further comprising:
generating modified image data for each of the plurality of image pixels using the relative chromatic distortion information for each of the plurality of image pixels.

14. The method of claim 13, wherein the generating modified image data for each of the plurality of image pixels using the relative chromatic distortion information for each of the plurality of image pixels comprises modifying first color component information for each of the plurality of image pixels using the chromatic distortion information for the associated one of the plurality of image pixels.

15. The method of claim 14, wherein modifying first color component information comprises replacing the first color component information with corrected first color component information.

16. A system for chromatic registration for biological sample imaging, the system comprising:
a sample positioner configured to position a biological sample to be imaged;
an imaging system including a microscope and an optical sensing array configured to obtain image data of a positioned sample, the image data comprising pixel data for a plurality of image pixels, the pixel data including first color component pixel data, second color component pixel data, and reference color component pixel data; and
a data processor configured to modify first color component pixel data of a particular pixel and second color component pixel data of a particular pixel using chromatic distortion data corresponding to the particular pixel, the chromatic distortion data indicative of a two-dimensional displacement of a first color component with respect to a reference color component at a location of the particular pixel, the chromatic distortion data further indicative of a two-dimensional displacement of a second color component with respect to the reference color component at the location of the particular pixel;
wherein the system is configured to position, in the sample positioner, a template including a plurality of characterization features at a plurality of different locations on the template thereby forming an array of discrete geometric figures, the plurality of characterization features including a first characterization feature, wherein a number of characterization features forming the array is chosen to obtain a sufficient granularity and an accuracy of chromatic distortion information; and
wherein the number of characterization features is directly proportional to the granularity; and inversely proportional to the accuracy of the chromatic distortion information and wherein the system is further configured to image the template to obtain template image data, and wherein the system is further configured to obtain the chromatic distortion data using the template image data; and
further wherein the system is configured to obtain image data from the biological sample; and to modify at least some of the image data obtained from the biological sample using the relative chromatic distortion information.

17. The system of claim 16, wherein the system is further configured to generate corrected image data corresponding to each of the plurality of pixels using chromatic distortion data corresponding to an associated one of the pixels.

18. The system of claim 17, wherein the system is further configured to automatically identify one or more target regions of a biological sample using the corrected image data.

19. A computer implemented method for chromatic registration of biological sample imaging, the method comprising:
acquiring an image of a template using an imaging system, the imaging system including a microscope and an optical sensing array, the template including at least one characterization feature that reflects or transmits light in each of three different colors, wherein the image includes three separate color signal components, each color signal component corresponding to a separate one of each of the three colors, each color signal component positionally offset from each of the other color signal components;
determining first color offset vector information indicative of a direction and magnitude of the positional offset of a second one of the color signal components relative to a first one of the color signal components;
determining second color offset vector information indicative of a direction and magnitude of the positional offset of a third one of the color signal components relative to the first one of the color signal components;
using the imaging system to acquire an image of a biological sample, at least a portion of the image including three separate color signal components, each color signal component corresponding to a separate one of each of the three colors;
modifying the image of the biological sample by using the first color offset vector information and the second color offset vector information to register the three separate color signal components for the portion of the image at the same location;
wherein the template includes a plurality of characterization features at a plurality of different locations on the template thereby forming an array of discrete geometric figures, each of the characterization features reflecting or transmitting light in each of the three different colors;
wherein first color offset vector information and second color vector offset information is determined for each one of the characterization features in the plurality of characterization features, the first color offset vector information and the second color vector offset information for all of the characterization features collectively comprising chromatic distortion information; and
wherein a number of characterization features forming the array is chosen to obtain a granularity and an accuracy of the chromatic distortion information, and wherein the number of characterization features is directly proportional to the granularity, and inversely proportional to the accuracy of the chromatic distortion information.

20. The method of claim 19, wherein the chromatic distortion information is used to modify the image of the biological sample to register the three separate color signal components at a plurality of locations in the image of the biological sample.

* * * * *

UNITED STATES PATENT AND TRADEMARK OFFICE
CERTIFICATE OF CORRECTION

PATENT NO. : 8,179,575 B2
APPLICATION NO. : 12/581647
DATED : May 15, 2012
INVENTOR(S) : Jose De La Torre-Bueno Page 1 of 1

It is certified that error appears in the above-identified patent and that said Letters Patent is hereby corrected as shown below:

In the Specification

Col. 5, Line 58, delete the first instance of the word "mechanical" and insert -- electrical --

Col. 9, Line 12, delete "844$a$", insert -- 844A --

Col. 10, Line 58, delete "can", insert -- to --

Col. 11, Line 6, after the word "then", delete "the"

Col. 12, Line 52, delete "comparator determines", insert -- comparator to determine --

Col. 13, Line 48, delete "the"

Signed and Sealed this
Eighteenth Day of February, 2014

Michelle K. Lee
*Deputy Director of the United States Patent and Trademark Office*